US012067832B2

(12) United States Patent
Zhu et al.

(10) Patent No.: US 12,067,832 B2
(45) Date of Patent: Aug. 20, 2024

(54) BLOCKCHAIN SYSTEM FOR MANAGING RESPONSIBLE GAMING DATA

(71) Applicant: IGT, Las Vegas, NV (US)

(72) Inventors: Yizhao Zhu, Macau S.A.R. (CN); Xiang Wu, Beijing (CN); Wei Hou, Macau S.A.R. (CN); Lixia Ji, Macau S.A.R. (CN); Guangyu Jin, Macau S.A.R. (CN)

(73) Assignee: IGT, Las Vegas, NV (US)

( * ) Notice: Subject to any disclaimer, the term of this patent is extended or adjusted under 35 U.S.C. 154(b) by 544 days.

(21) Appl. No.: 17/236,513

(22) Filed: Apr. 21, 2021

(65) Prior Publication Data

US 2021/0335093 A1 Oct. 28, 2021

Related U.S. Application Data

(60) Provisional application No. 63/013,911, filed on Apr. 22, 2020.

(51) Int. Cl.
*G07F 17/32* (2006.01)
*H04L 9/32* (2006.01)
*H04L 9/00* (2022.01)

(52) U.S. Cl.
CPC ...... *G07F 17/3237* (2013.01); *G07F 17/3241* (2013.01); *G07F 17/3244* (2013.01); *H04L 9/3236* (2013.01); *H04L 9/50* (2022.05)

(58) Field of Classification Search
CPC ............ G07F 17/3237; G07F 17/3241; G07F 17/3244; H04L 9/50; H04L 9/3236; H04L 9/3226
See application file for complete search history.

(56) References Cited

U.S. PATENT DOCUMENTS

| 10,846,984 | B2* | 11/2020 | Merati | G07F 17/3223 |
| 2011/0245943 | A1* | 10/2011 | Agarwal | G07F 17/3227 700/91 |
| 2015/0141123 | A1* | 5/2015 | Callaway | G07F 17/3209 463/25 |
| 2016/0247354 | A1* | 8/2016 | Arnone | G07F 17/3288 |
| 2017/0004679 | A1* | 1/2017 | Wilkus | G07F 17/3295 |
| 2017/0344987 | A1* | 11/2017 | Davis | G06Q 20/10 |
| 2019/0118094 | A1* | 4/2019 | McCoy | A63F 13/85 |
| 2019/0130701 | A1* | 5/2019 | Simons | H04L 9/3239 |

(Continued)

*Primary Examiner* — Steve Rowland
(74) *Attorney, Agent, or Firm* — Sage Patent Group (57) ABSTRACT

A blockchain system, and related devices, systems, and methods are provided. A blockchain node device node device receives a first message from a gaming device in communication with the blockchain node device, the first message including a request for first play data corresponding to historical wagering activity by a player and wagering limit data associated with a limitation on wagering activity by the player. The blockchain node transmits a first blockchain block of a plurality of blockchain blocks of a blockchain data structure to the gaming device, wherein the first blockchain block includes the first play data. The blockchain node receives a second message from the gaming device, the second message including a second blockchain block including hash data associated with the first blockchain block and second play data corresponding to further wagering activity by the player. The blockchain node adds the second blockchain block to the blockchain data structure.

20 Claims, 7 Drawing Sheets

(56) References Cited

U.S. PATENT DOCUMENTS

| | | | |
|---|---|---|---|
| 2019/0180558 A1* | 6/2019 | Merati | H04L 9/0637 |
| 2019/0207768 A1* | 7/2019 | Hardy | H04L 63/0823 |
| 2020/0027315 A1* | 1/2020 | Cotton | G06Q 20/08 |
| 2020/0105096 A1* | 4/2020 | Ovalle | G07F 17/3225 |
| 2020/0152003 A1* | 5/2020 | Georgiou | G07F 17/3241 |
| 2020/0202668 A1* | 6/2020 | Cotta | G07F 17/3281 |
| 2020/0357233 A1* | 11/2020 | Ma | G07F 17/3241 |
| 2020/0372763 A1* | 11/2020 | Greiner, Jr. | G07F 17/3288 |
| 2020/0380826 A1* | 12/2020 | Taylor | G07F 17/3258 |
| 2021/0052981 A1* | 2/2021 | Yi | G07F 17/3237 |
| 2021/0074120 A1* | 3/2021 | Ragnoni | G07F 17/3241 |
| 2021/0093954 A1* | 4/2021 | Butler | A63F 13/34 |

\* cited by examiner

BLOCKCHAIN SYSTEM FOR MANAGING RESPONSIBLE GAMING DATA

CROSS REFERENCE TO RELATED APPLICATIONS

This application claims domestic priority to U.S. Provisional Patent Application No. 63/013,911, filed on Apr. 22, 2020, the disclosure and content of which is incorporated by reference herein in its entirety.

BACKGROUND OF THE DISCLOSURE

Embodiments of the disclosure relate to managing responsible gaming data, and in particular to a blockchain system for managing responsible gaming data in a casino environment across multiple properties, and related devices, systems, and methods.

Responsible gaming management systems are used within the casino industry throughout the world. The goal of these programs is to ensure that patrons safely and responsibly enjoy casino games as a form of entertainment. Existing responsible gaming management systems are typically deployed in individual casino sites, which limits the scope of the systems and may decrease the benefits and practicability of the responsible gaming system. Thus, there is a need for a secure way to track and manage responsible gaming data across multiple casino properties.

BRIEF SUMMARY OF THE DISCLOSURE

Some embodiments are to a blockchain system for managing responsible gaming data, comprising a processor circuit and a memory coupled to the processor circuit. The memory includes machine-readable instructions that, when executed by the processor circuit, cause the processor circuit to receive, at a blockchain node device, a plurality of messages from a gaming device in communication with the blockchain node device. Each message includes a blockchain block including hash data associated with a stored blockchain block of a blockchain data structure, and play data corresponding to wagering activity by a player of the gaming device. The instructions further cause the processor circuit to, for each message, store the blockchain block in the blockchain data structure. The instructions further cause the processor circuit to access stored responsible gaming data associated with the player. The instructions further cause the processor circuit to, based on the play data of the plurality of blockchain blocks and the stored responsible gaming data, modify the stored responsible gaming data.

Some embodiments are directed to a gaming device including a processor circuit and a memory coupled to the processor circuit. The memory includes machine-readable instructions that, when executed by the processor circuit, cause the processor circuit to determine an identity of a player of the gaming device. The instructions further cause the processor circuit to transmit a first message to a blockchain node device in communication with the gaming device, the first message including a request for first play data corresponding to historical wagering activity by a player and wagering limit data associated with a limitation on wagering activity by the player. The instructions further cause the processor circuit to receive a first blockchain block of a plurality of blockchain blocks of a blockchain data structure from the blockchain node device, wherein the first blockchain block includes the first play data. The instructions further cause the processor circuit to determine, based on the first blockchain block, whether the player is authorized to place a wager at the gaming device. The instructions further cause the processor circuit to receive an input indicative of a wager by the player. The instructions further cause the processor circuit to, in response to a determination that the player is authorized to place a new wager, resolve the wager. The instructions further cause the processor circuit to transmit a second message to the blockchain node device, the second message including a second blockchain block including hash data associated with the first blockchain block, and second play data corresponding to the new wager.

Some embodiments are directed to a method including receiving, at a blockchain node device, a first message from a gaming device in communication with the blockchain node device, the first message including a request for first play data corresponding to historical wagering activity by a player and wagering limit data associated with a limitation on wagering activity by the player. The method further includes selecting, by the blockchain node device based on the first message, a first blockchain block of a plurality of blockchain blocks of a blockchain data structure. Each blockchain block of the plurality of blockchain blocks includes hash data associated with a previous blockchain block of the plurality of blockchain blocks and play data corresponding to wagering activity, and the play data of the first blockchain block includes the first play data. The method further includes transmitting, from the blockchain node device, the first blockchain block to the gaming device. The method further includes receiving, at the blockchain node device, a second message from the gaming device, the second message including a second blockchain block including hash data associated with the first blockchain block, and second play data corresponding to further wagering activity by the player. The method further includes adding, by the blockchain node device, the second blockchain block to the blockchain data structure.

DETAILED DESCRIPTION OF THE DISCLOSURE

Embodiments of the disclosure relate to managing responsible gaming data, and in particular to a blockchain system for managing responsible gaming data in a casino environment across multiple properties, and related devices, systems, and methods. In this regard, in some embodiments, a decentralized blockchain-based responsible gaming management system is able to share the player's real time play status easily among casinos. In some examples, a wagering limit (set by the player or by regulation, for example) can take effect in all the casinos within the decentralized system, in a private, secure and non-erasable way. Advantages include increased compliance with wagering limits by players, and more accurate and secure tracking of responsible gaming data.

Many responsible gaming programs provide the ability to set different limits on wagering activity, such as a limit on an amount of money wagered, an amount of money lost, an amount of time played, etc. These limits may be required by jurisdiction regulation or may be set by an individual player as a safety measure. Providing, tracking, and managing associated responsible gaming data as part of a blockchain data structure permits this data to be shared between multiple casino properties in a secure, non-falsifiable way, so that compliance with responsible gaming limits is increased.

In some embodiments, a blockchain system is formed by multiple casinos to manage players' game play data and responsible gaming limits as part of a blockchain data structure. For example, players' game play data includes bet amounts, loss amounts, and/or play time, etc. Likewise, gaming limits may include a total bet amount threshold, a total loss amount threshold, and/or a total game time threshold, etc.

In some embodiments, before the player starts to play a game at a member casino, the system will fetch the player's aggregated game play data from the blockchain data structure and compare the data with the player's limit settings. Alert messages or other designed system behaviors may be triggered if these limits are reached or exceeded, for the benefit of the player and/or casino. As the player continues to play at the casino, a new blockchain block containing the new play data is generated and added to the blockchain data structure.

In some examples, the blockchain data structure, or portions thereof, may be encrypted. For example, the entire blockchain data structure may be encrypted to restrict access to authorized casino operators. Alternatively, or in addition, portions of the individual blockchain blocks, such as player data, identity data, wagering limit data, etc., may be separately encrypted to protect the privacy and personal information of individual players. For example, the blockchain data structure may be arranged so that the hash data is available to authorized users of the blockchain system so that the integrity of the blockchain data structure can be maintained. Alternatively, or in addition, individual player data or other data from the blockchain blocks may only be decrypted and accessed under certain circumstances, such as when the associated player verifies his identity and/or attempts to place a wager. In other embodiments, unique blockchain data structures may be generated for individual players or groups of players, and with customized levels and/or layers of encryption, as desired.

In some embodiments, the casino may set a limitation on wagering activity for a player, such as when required by regulation. The player may also set a limitation voluntarily. Information pertaining to the limitation may be provided to the blockchain system, for example as part of a new blockchain block, and all other participating casinos may receive the updated limitation data.

In some embodiments, a player provides authentication and/or identification at a gaming device on a casino floor, for example, by using a physical or virtual card, a mobile phone, figure print scan, iris scan, or other method. The responsible gaming system receives the player card identification from game equipment and calculates a player hash code for that player. The responsible gaming system then fetches that player's data from the blockchain data structure based on the player hash code. Player data may include that player's limit settings and aggregated gaming play data uploaded by all participating casinos. If any limitation on wagering (e.g., total bet amount, total loss amount, total gaming time, etc.) has been reached, the player may receive an alert message and/or other system defined behaviors, such as disabling game play at the gaming device.

In another example, as a player under the limit thresholds places wagers over time, the player's data may be periodically compared to the player's wagering limits. The system may periodically generate new blockchain blocks, such as at set time intervals or at the end of the player's gaming session, which are then added to the blockchain data structure so that the updated player data is available to all other participating casinos.

For casinos, benefits may include the ability to accurately manage and enforce responsible gaming limits in a visible, verifiable way. The decentralized structure of the system can also reduce cost while maintaining data security and integrity.

Figure 1:
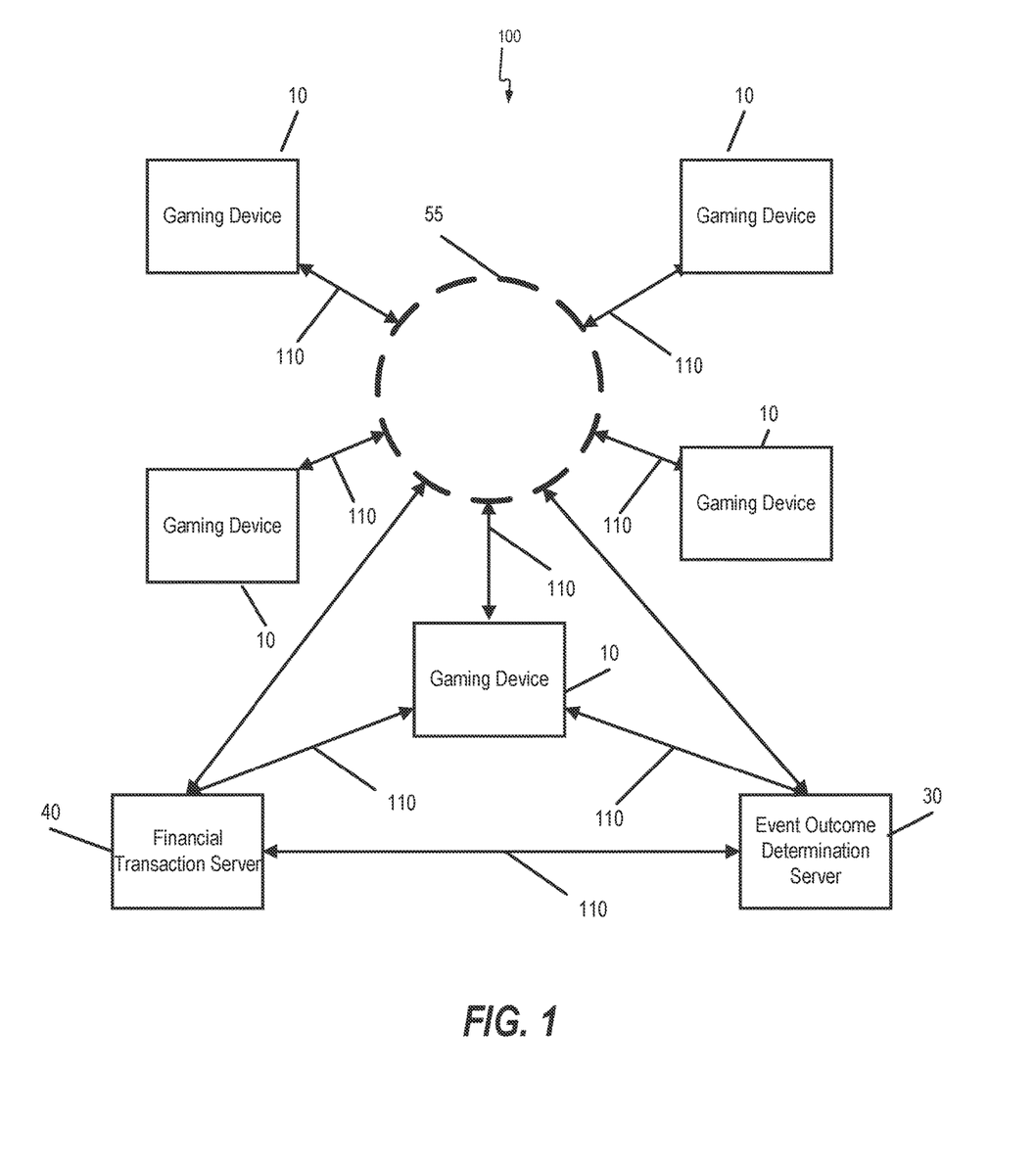
FIG. 1 is a schematic block diagram illustrating a system architecture for a blockchain system, according to some embodiments.

Reference is now made to FIG. 1, which is a schematic block diagram illustrating a system architecture according to some embodiments herein. The architecture may provide a blockchain system 100 having a plurality of gaming devices 10 and other devices (e.g., servers 30, 40) with access to a blockchain network 55. These and other computing devices may be referred to generally as blockchain node devices. The blockchain network 55 may include one or more blockchain data structures having multiple different data blocks ("blockchain blocks") containing player data and other data. In some embodiments, certain blockchain nodes may store and/or cause to be stored an instance of the blockchain data structure, which may include a communication channel 110 to the blockchain network 55. In this manner, each blockchain node device may be communicatively coupled, directly and/or indirectly, to every other blockchain node device. Although not illustrated in this figure, some embodiments provide that intervening networks may be included in the communication channel 110.

In some embodiments, one or more gaming devices 10 may include and/or be communicatively coupled to a financial transaction server 40. In some embodiments, the financial transaction server 40 may receive funds and/or payment obligations from bettors using the gaming device 10. For example, some embodiments provide that the financial transaction server 40 may hold funds in an escrow account until the outcome of the event is determined and the winning bettor is identified.

In some embodiments, one or more gaming devices 10 may include and/or be communicatively coupled to an event outcome determination server 30. The event outcome determination server 30 may determine the outcome of an event upon which the wager is based to resolve individual wagers. Although the financial transaction server 40 and the event outcome determination server 30 are illustrated and discussed as operating on separate servers, embodiments herein provide that any combination thereof may be used.

Figure 2:
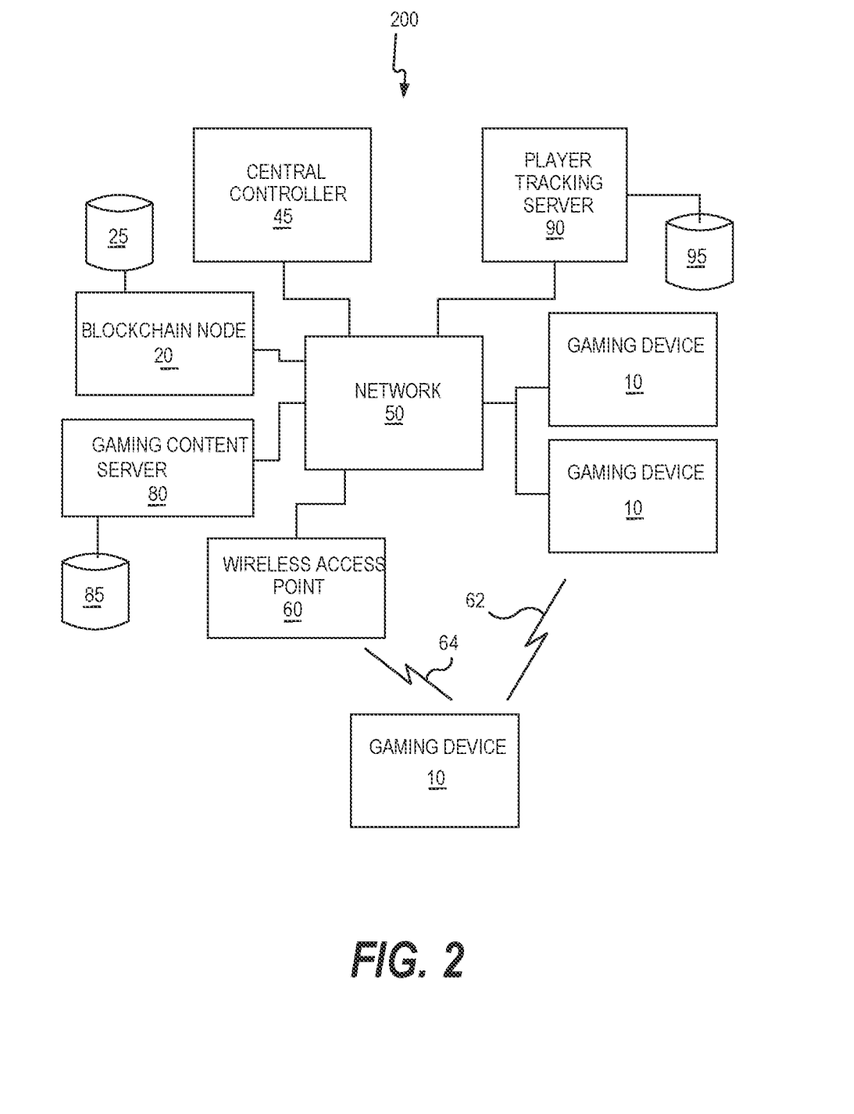
FIG. 2 illustrates a computing system containing a dedicated blockchain node and a plurality of gaming devices, according to some embodiments.

Reference is now made to FIG. 2, which illustrates a gaming system 200 that includes a number of gaming devices 10 connected via a data communication network 50. The system 200 may be located, for example, on the premises of a gaming establishment, such as a casino, in a private residence, or may include components that are located at different locations. Some embodiments provide that gaming devices 10 may provide options, inputs and/or access for peer-to-peer wagering operations. In some embodiments, gaming devices 10 may be in communication with each other and/or a central controller 45 through a data communication network 50, or remote communication link. The data communication network 50 and the blockchain network 55 may be part of a common network, or may be separate networks, as desired. The data communication network 50 may be a private data communication network that is operated, for example, by the gaming facility that operates the gaming device 10, a publicly accessible data communication network such as the Internet, or a combination thereof. Communications over the data communication network 50 may be encrypted for security. The central controller 45 may be any suitable server or computing device which includes at least one processor circuit, such as a processor, and at least one memory or storage device. Each gaming device 10 may include a processor circuit that transmits and receives events, messages, commands or any other suitable data or signal between the gaming device 10 and the central controller 45 and/or other gaming devices 10. The gaming device processor is operable to execute such communicated events, messages or commands in conjunction with the operation of the gaming device 10. Moreover, the processor of the central controller 45 is configured to transmit and receive events, messages, commands or any other suitable data or signal between the central controller 45 and each of the individual gaming devices 10. In some embodiments, one or more of the functions of the central controller 45 may be performed by one or more gaming device processors. Moreover, in some embodiments, one or more of the functions of one or more gaming device processors as disclosed herein may be performed by the central controller 45.

A wireless access point 60 provides wireless access to the data communication network 50. The wireless access point 60 may be connected to the data communication network 50 as illustrated in FIG. 2 or may be connected directly to the central controller 45 or another server connected to the data communication network 50.

One or more content servers, such as a gaming content server 80, may also be connected through the data communication network 50. Similarly, the gaming content server 80 may manage delivery of the gaming content to the user of a gaming device 10. The gaming content may be stored in a gaming content database 85. A blockchain node 20 may manage, access, update, storage, consensus determination, and/or excluded data corresponding to the blockchain data structure, which may be stored on one or more blockchain databases 25 for example. Although the blockchain node 20 in this embodiment is illustrated as a separate device, it should be understood that any computing device, such as a gaming device 10, server, or other device, may be used as a blockchain node as well. For example, the blockchain node 20 and a gaming content server 80 may be implemented within or separately from each other. Alternatively, or in addition, the blockchain node 20 and a gaming content server 80 may also be implemented within or separately from the central controller 45.

A player tracking server 90 may also be connected through the data communication network 50. The player tracking server 90 may manage a player tracking account that tracks the gameplay and spending and/or other player preferences and customizations of a player, i.e., the player of the gaming device 10, responsible gaming limit data for the player, manages loyalty awards for the player, manages funds deposited or advanced on behalf of the player, and other functions. Player information managed by the player tracking server 90 may be stored in a player information database 95.

Some embodiments provide that the gaming device 10 includes one or more user interfaces to provide access to the blockchain data structure disclosed herein. For example, in some embodiments, the gaming device 10 may include a slot machine, an electronic table game, or a sports betting terminal, among others.

The gaming devices 10 communicate with one or more elements of the system 200 to coordinate providing wagering at the casino or other gaming establishment. For example, in some embodiments, a gaming device 10 may communicate directly with another gaming device 10 over a wireless interface 62, which may be a WiFi link, a Bluetooth link, a near-field communication (NFC) link, etc. In other embodiments, the gaming device 10 may communicate with the data communication network 50 (and devices connected thereto, including gaming devices) over a wireless interface 64 with the wireless access point 60. The wireless interface 64 may include a WiFi link, a Bluetooth link, an NFC link, etc. In still further embodiments, the gaming device 10 may communicate with other gaming devices 10 or other devices over the wireless interface 62 and the wireless access point 60 over the wireless interface 64. In these embodiments, the wireless interface 62 and the wireless interface 64 may use different communication protocols and/or different communication resources, such as different frequencies, time slots, spreading codes, etc. For example, in some embodiments, the wireless interface 62 may be a Bluetooth link, while the wireless interface 64 may be a WiFi link. The wireless interfaces 62, 64 allow the gaming devices 10 and/or central controller 45 to coordinate providing player data from gaming devices 10.

Figure 3:
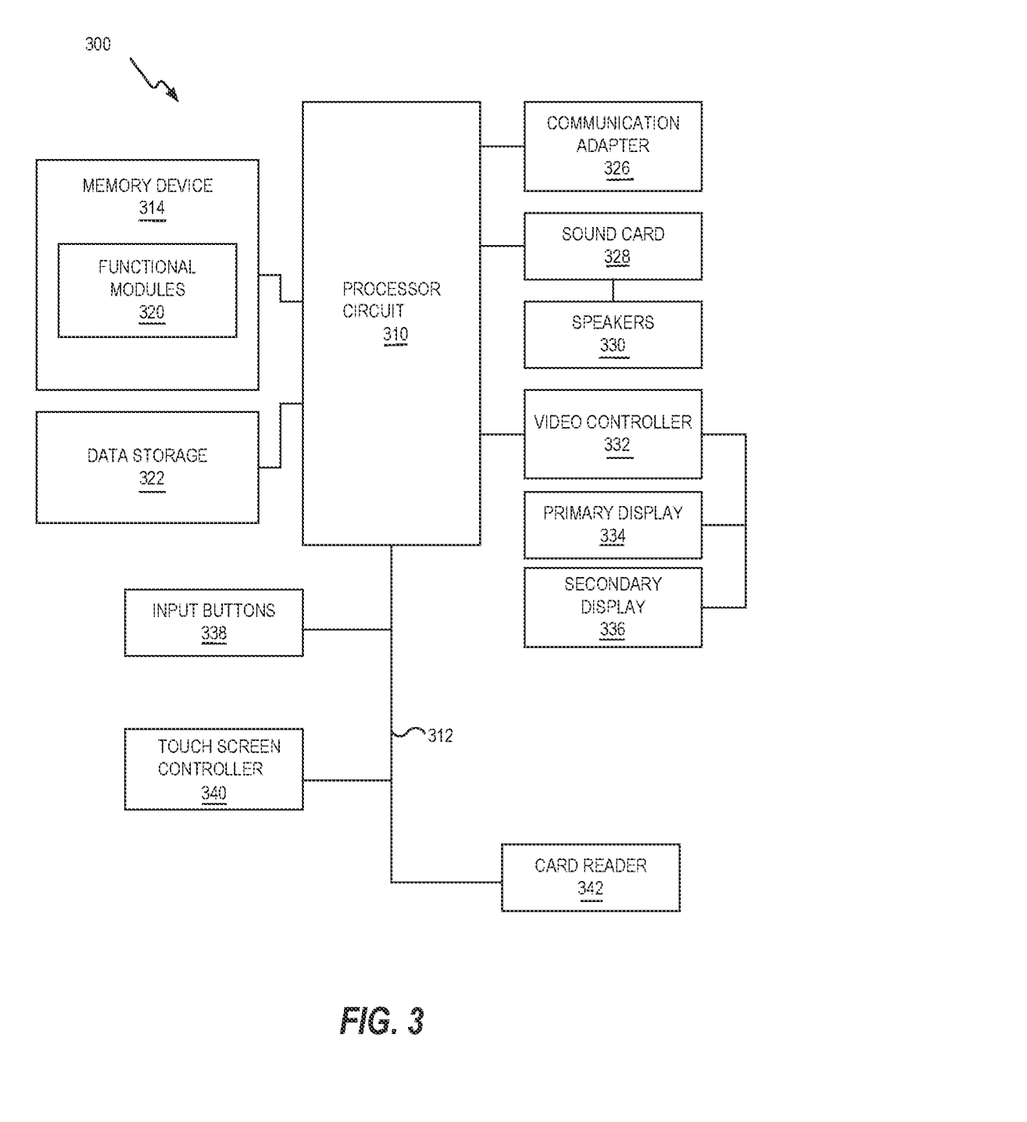
FIG. 3 is a block diagram that illustrates various components of a computing device that may embody or be included as part of the devices, systems, and/or components above, according to some embodiments.

Reference is now to FIG. 3, which is a block diagram that illustrates various components of a computing device 300, which may embody or be included as part of the devices, systems, and/or components above, according to some embodiments. As shown in FIG. 3, the computing device 300 may include a processor circuit 310 that controls operations of the computing device 300. Although illustrated as a single processor, multiple special purpose and/or general-purpose processors and/or processor cores may be provided in the computing device 300. For example, the computing device 300 may include one or more of a video processor, a signal processor, a sound processor and/or a communication controller that performs one or more control functions within the computing device 300. The processor circuit 310 may be variously referred to as a "controller," "microcontroller," "microprocessor" or simply a "computer." The processor circuit 310 may further include one or more application-specific integrated circuits (ASICs).

Various components of the computing device 300 are illustrated in FIG. 3 as being connected to the processor circuit 310. It will be appreciated that the components may be connected to the processor circuit 310 and/or each other through one or more buses 312 including a system bus, a communication bus and controller, such as a Universal Serial Bus (USB) controller and USB bus, a network interface, or any other suitable type of connection.

The computing device 300 further includes a memory device 314 that stores one or more functional modules 320 for performing the operations described above. Alternatively, or in addition, some of the operations described above may be performed by other devices connected to the network, such as the network 50 of the system 200 of FIG. 2, for example. The computing device 300 may communicate with other devices connected to the network to facilitate performance of some of these operations. For example, the computing device 300 may communicate and coordinate with certain displays to identify elements of a game being displayed by a particular display.

The memory device 314 may store program code and instructions, executable by the processor circuit 310, to control the computing device 300. The memory device 314 may include random access memory (RAM), which can include non-volatile RAM (NVRAM), magnetic RAM (ARAM), ferroelectric RAM (FeRAM) and other forms as commonly understood in the gaming industry. In some embodiments, the memory device 314 may include read only memory (ROM). In some embodiments, the memory device 314 may include flash memory and/or EEPROM (electrically erasable programmable read only memory). Any other suitable magnetic, optical and/or semiconductor memory may operate in conjunction with the gaming device disclosed herein.

The computing device 300 may include a communication adapter 326 that enables the computing device 300 to communicate with remote devices, such as the wireless network, another computing device 300, and/or a wireless access point, over a wired and/or wireless communication network, such as a local area network (LAN), wide area network (WAN), cellular communication network, or other data communication network, e.g., the network 50 of FIG. 2.

The computing device 300 may include one or more internal or external communication ports that enable the processor circuit 310 to communicate with and to operate with internal or external peripheral devices, such as a sound card 328 and speakers 330, video controllers 332, a primary display 334, a secondary display 336, input buttons 338 or other devices such as switches, keyboards, pointer devices, and/or keypads, a touch screen controller 340, a card reader 342, currency acceptors and/or dispensers, cameras, sensors such as motion sensors, mass storage devices, microphones, haptic feedback devices, and/or wireless communication devices. In some embodiments, internal or external peripheral devices may communicate with the processor through USB hub (not shown) connected to the processor circuit 310. Although illustrated as being integrated with the computing device 300, any of the components therein may be external to the computing device 300 and may be communicatively coupled thereto. Although not illustrated, the computing device 300 may further include a rechargeable and/or replaceable power device and/or power connection to a main power supply, such as a building power supply.

In some embodiments, the computing device 300 may include a head mounted device (HMD) and may include optional wearable add-ons that include one or more sensors and/or actuators. Including ones of those discussed herein. The computing device 300 may be a head-mounted mixed-reality device configured to provide mixed reality elements as part of a real-world scene being viewed by the user wearing the computing device 300.

Figure 4:
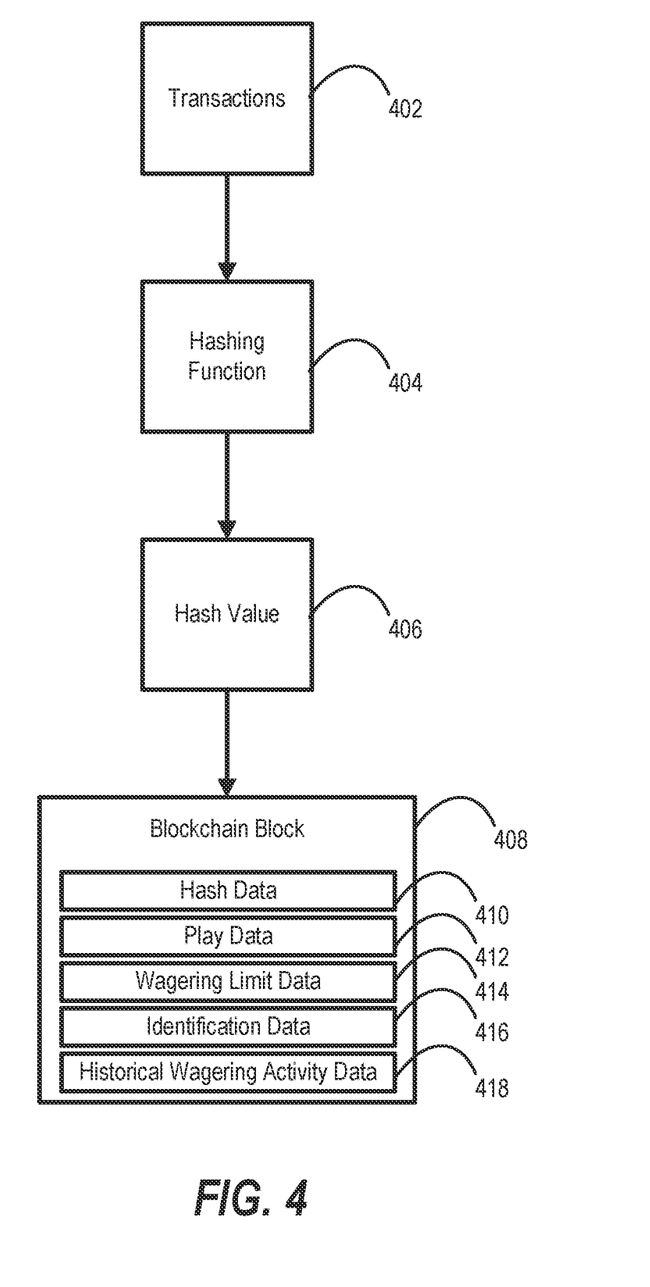
FIG. 4 is a schematic block diagram illustrating various operations for a blockchain transaction according to some embodiments.

Reference is now made to FIG. 4, which is a schematic block diagram illustrating various operations for a blockchain transaction recordation according to some embodiments. As illustrated in FIG. 4, transactions 402 may occur at various blockchain nodes. In accordance with various embodiments, a hash may be created for each entry. For example, a cryptographic hash function may create a one-way, (essentially) collision free signature of the entry. The hash algorithm generates a hash. Using hashing function 404, hash values 406 of these transactions are created and added to blockchain blocks 408 that are in the blockchain data structure.

In this example, each blockchain block 408 may include one or more different types of data. For example, each blockchain block 408 may include hash data 410 indicative of a result of the hashing function 404, play data 412 indicative of play and/or wagering activity by the player, wagering limit data 414 indicative of a wagering limit for the player, identification data 416 indicative of an identity of the player (e.g., a unique identifier), and/or historical wagering activity data 418 indicative of historical wagering activity by the player.

As a general principle, a validation process may be performed to ensure that each new blockchain block 408 meets the criteria for inclusion into the blockchain data structure. In a blockchain configuration, there are varying consensus algorithms that can be used. For example, a private blockchain may choose an algorithm such as Practical Byzantine Fault Tolerance (PBFT). The PBFT mechanism may be useful for small networks, such as networks having fewer than about 100 nodes. Other examples include a Proof of Work (PoW) consensus algorithm and/or a Proof of Stake (PoS) consensus algorithm, which may be used as the value of an underlying data block and/or value changes.

Figure 5:
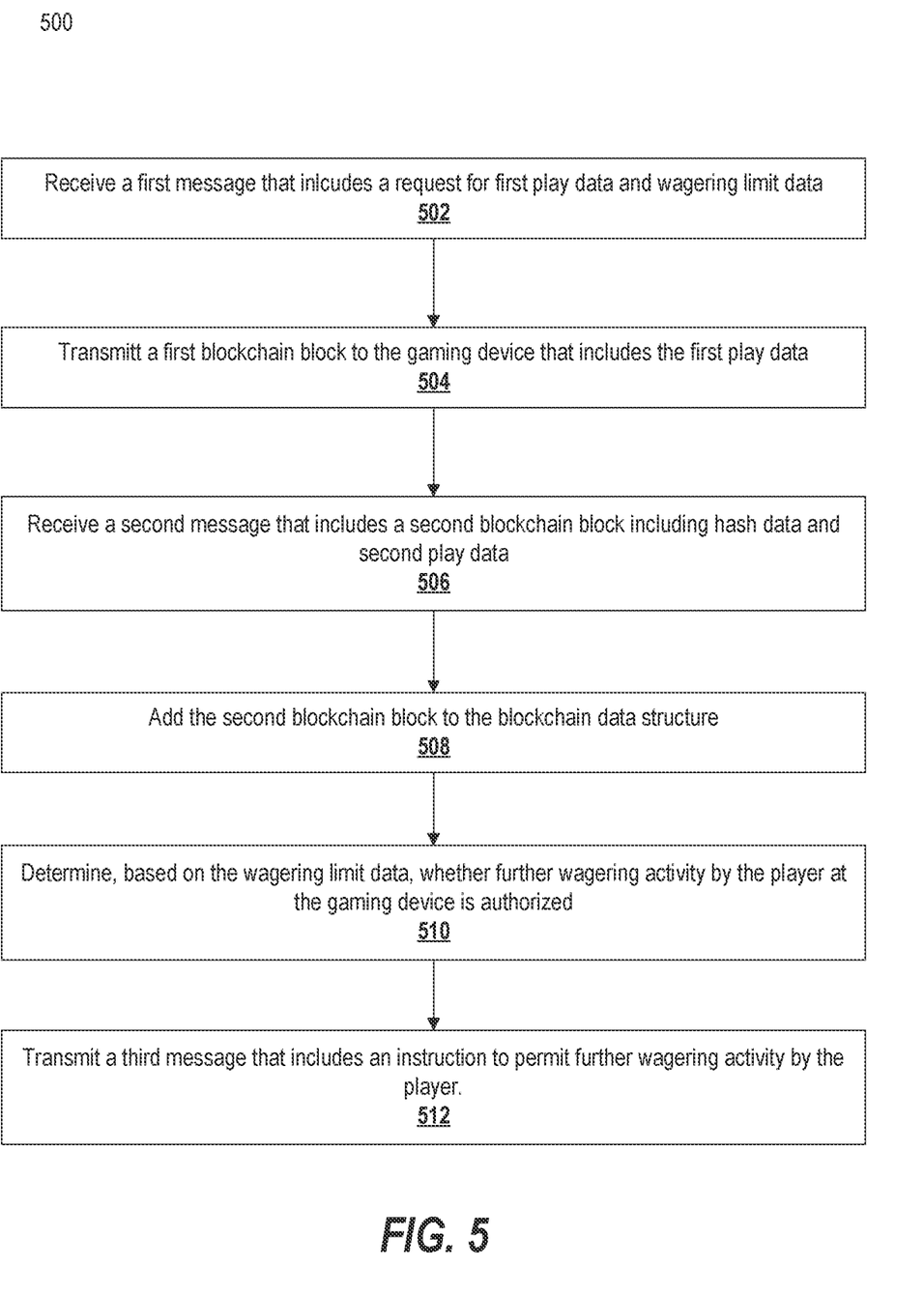
FIG. 5 is a schematic flow diagram illustrating operations of a blockchain node for managing responsible gaming data, according to some embodiments.

FIG. 5 is a schematic flow diagram illustrating operations 500 of a blockchain system for managing responsible gaming data, according to some embodiments. The operations 500 include receiving a first message from a gaming device in communication with the blockchain node device (Block 502). In this example, the first message includes a request for first play data corresponding to historical wagering activity by a player and wagering limit data associated with a limitation on wagering activity by the player.

The operations 500 may further include transmitting a first blockchain block to the gaming device (Block 504). In this example, the first blockchain block includes the first play data and is part of a plurality of blockchain blocks that form a blockchain data structure.

In some embodiments, each blockchain block of the plurality of blockchain blocks may include hash data associated with a previous blockchain block of the plurality of blockchain blocks and play data corresponding to wagering activity. The play data for each blockchain block of the plurality of blockchain blocks may further include identification data indicative of an identity of a player associated with the wagering activity. In some examples, the play data for each blockchain block of the plurality of blockchain blocks may further include wagering limit data indicative of the wagering limit associated with the player.

In some examples, the play data for each blockchain block of the plurality of blockchain blocks may further include historical wagering activity data indicative of a result of the wagering activity. For example, the historical wagering activity may be further indicative of a total amount wagered by the player during a predetermined time period. The historical wagering activity may be further indicative of a total amount lost by the player during a predetermined time period. The historical wagering activity may be further indicative of a total amount time played by the player during a predetermined time period.

The operations 500 may further include receiving a second message from the gaming device (Block 506). In this example, the second message includes a second blockchain block that includes hash data associated with the first blockchain block and second play data corresponding to further wagering activity by the player. The operations 500 may further include adding the second blockchain block to the blockchain data structure (Block 508).

In some embodiments, the operations 500 may further include determining, based on the wagering limit data, whether further wagering activity by the player at the gaming device is authorized (Block 510). In response to a determination that the player is authorized to continue wagering activity, the operations 500 may further include transmitting a third message to the gaming device that includes an instruction to permit further wagering activity by the player (Block 512).

Figure 6:
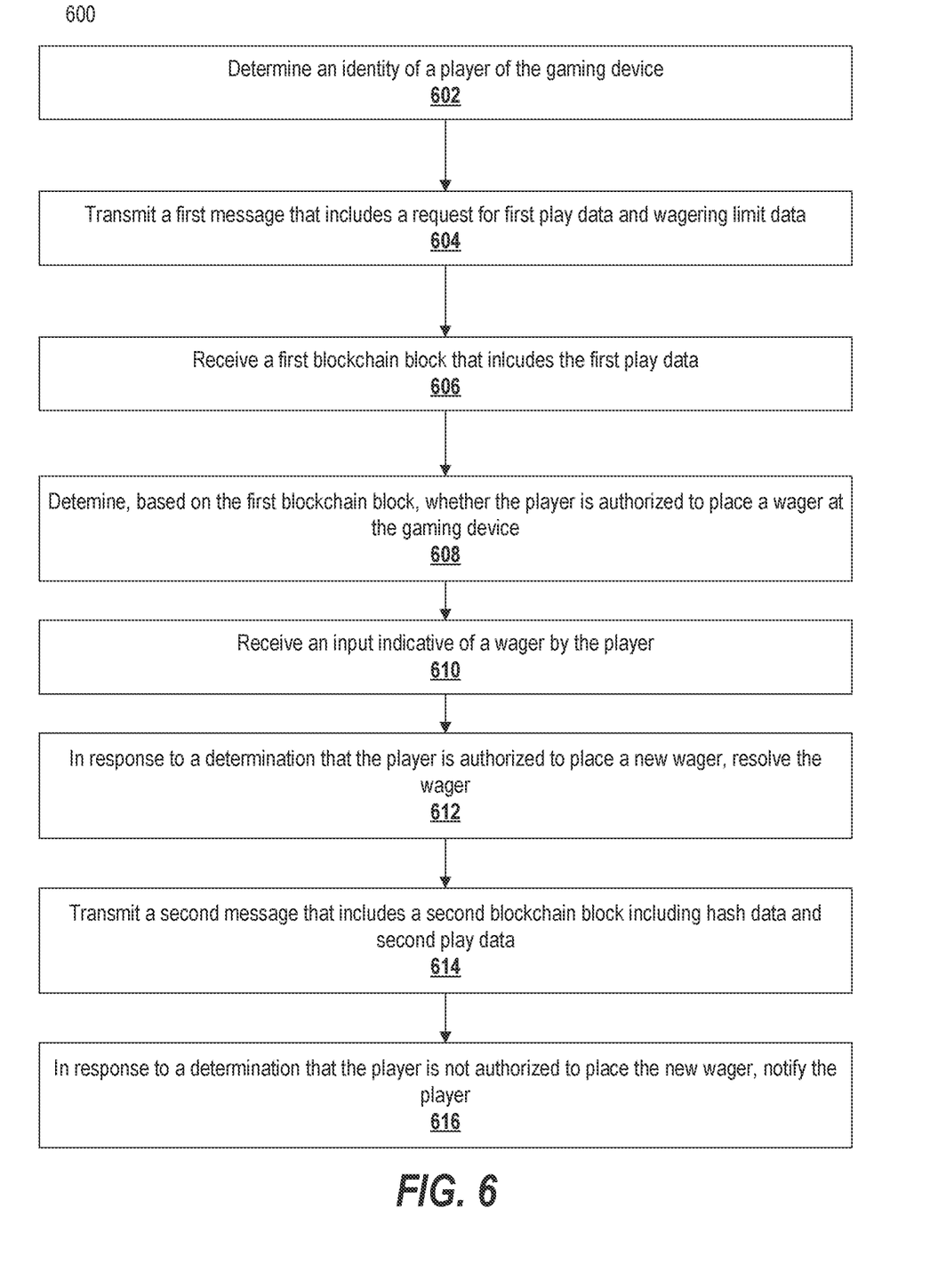
FIG. 6 is a schematic flow diagram illustrating operations of a gaming device for managing responsible gaming data via a blockchain node, according to some embodiments.

FIG. 6 is a schematic flow diagram illustrating operations 600 of a blockchain system for managing responsible gaming data, according to some embodiments. The operations 600 include determining an identity of a player of the gaming device (Block 602) and transmitting a first message to a blockchain node device in communication with the gaming device (Block 604). In this example, the first message includes a request for first play data corresponding to historical wagering activity by a player and wagering limit data associated with a limitation on wagering activity by the player.

The operations 600 further include receiving a first blockchain block that includes the first play data (Block 606). The operations 600 may further include determining, based on the first blockchain block, whether the player is authorized to place a wager at the gaming device (Block 608).

Each blockchain block of the plurality of blockchain blocks may include hash data associated with a previous blockchain block of the plurality of blockchain blocks, and play data corresponding to wagering activity. The play data for each blockchain block of the plurality of blockchain blocks may include identification data indicative of an identity of a player associated with the wagering activity, and/or wagering limit data indicative of the wagering limit associated with the player. In some examples, the play data for each blockchain block includes historical wagering activity data indicative of a result of the wagering activity.

The operations 600 further include receiving an input indicative of a wager by the player (Block 610), and, in response to a determination that the player is authorized to place a new wager, resolving the wager (Block 612).

The operations 600 further include transmitting a second message to the blockchain node device (Block 614). The second message includes a second blockchain block including hash data associated with the first blockchain block, and second play data corresponding to the new wager. The operations 600 may further include, in response to a determination that the player is not authorized to place the new wager, notifying the player (Block 616).

Figure 7:
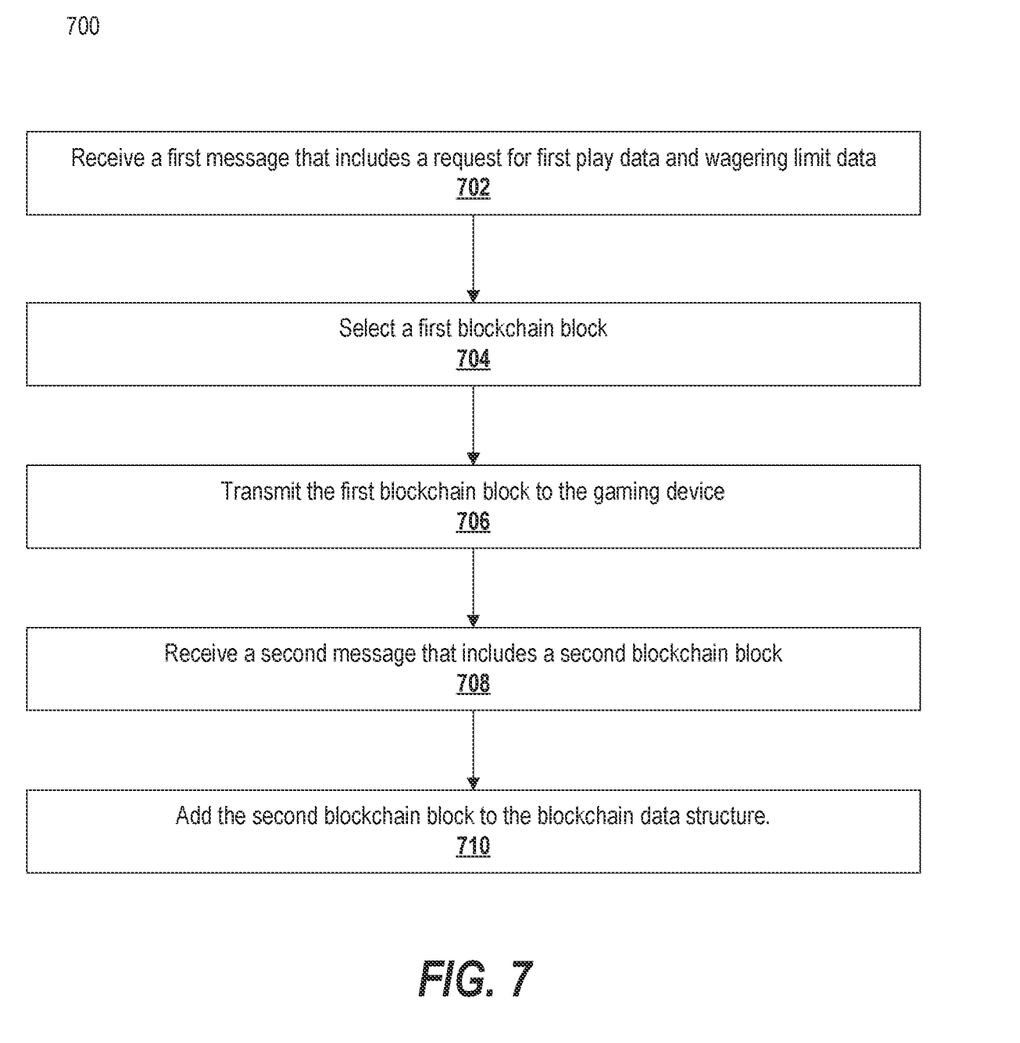
FIG. 7 is a schematic data flow diagram illustrating operations of a method of operating blockchain system having a blockchain node and a gaming device for managing responsible gaming data, according to some embodiments.

FIG. 7 is a schematic flow diagram illustrating operations 700 of a blockchain system for managing responsible gaming data, according to some embodiments. The operations 700 include receiving, at a blockchain node device, a first message from a gaming device (Block 702). In this example, the first message includes a request for first play data corresponding to historical wagering activity by a player and wagering limit data associated with a limitation on wagering activity by the player.

The operations 700 further include selecting, by the blockchain node device, a first blockchain block (Block 704). In this example, each blockchain block includes hash data associated with a previous blockchain block of the plurality of blockchain blocks and play data corresponding to wagering activity. The play data of the first blockchain block further includes the first play data. In this example, the play data for each blockchain block includes wagering limit data indicative of the wagering limit associated with the player.

The operations 700 further include transmitting, from the blockchain node device, the first blockchain block to the gaming device (Block 706), and receiving, at the blockchain node device, a second message from the gaming device (Block 708). The second message includes a second blockchain block that includes hash data and second play data corresponding to further wagering activity by the player. The operations 700 further include adding the second blockchain block to the blockchain data structure (Block 710).

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, radio-frequency (RF), etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks. The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

In some embodiments, a device, apparatus, system and/or computer program product may be described as causing a result and/or action. In such embodiments, causing may include actually performing the action and/or result and/or performing any action that causes another device, apparatus, system and/or computer program product to cause the result or action.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A blockchain system for managing responsible gaming data, comprising:
   a processor circuit; and
   a memory coupled to the processor circuit, the memory comprising machine-readable instructions that, when executed by the processor circuit, cause the processor circuit to:
   receive, at a blockchain node device, a plurality of messages from a gaming device in communication with the blockchain node device, each message comprising a blockchain block comprising:
      hash data associated with a stored blockchain block of a blockchain data structure; and
      play data corresponding to wagering activity by a player of the gaming device, the play data comprising historical wagering activity data indicative of a result of the wagering activity indicative of a total amount time played by the player during a predetermined time period;
   for each message, store the blockchain block in the blockchain data structure;
   access stored responsible gaming data associated with the player; and based on the play data of the plurality of blockchain blocks and the stored responsible gaming data, modify the stored responsible gaming data.

2. The blockchain system of claim 1, wherein the play data for each blockchain block of the plurality of blockchain blocks comprises:
identification data indicative of an identity of the player associated with the wagering activity.

3. The blockchain system of claim 2, wherein the play data for each blockchain block of the plurality of blockchain blocks further comprises wagering limit data indicative of a wagering limit associated with the player, and
wherein the instruction to modify the stored responsible gaming data is further based on the wagering limit data.

4. The blockchain system of claim 3, wherein the machine-readable instructions further cause the processor circuit to:
receive, from the gaming device, an authorization request message for further wagering activity by the player, the authorization request message comprising a first blockchain block of the blockchain data structure;
determine, based on the first blockchain block and the stored responsible gaming data, whether the further wagering activity by the player at the gaming device is authorized; and
in response to a determination that the further wagering activity is authorized, transmit an authorization message to the gaming device comprising an instruction to permit the further wagering activity by the player.

5. The blockchain system of claim 4, wherein the instructions that cause the processor circuit to determine whether the further wagering activity is authorized further cause the processor circuit to:
determine whether the first blockchain block is valid; and
in response to a determination that the first blockchain block is not valid, transmit an authorization denial message to the gaming device comprising an instruction to restrict the further wagering activity by the player.

6. The blockchain system of claim 1, wherein the historical wagering activity is further indicative of a total amount wagered by the player during a predetermined time period.

7. The blockchain system of claim 1, wherein the historical wagering activity is further indicative of a total amount lost by the player during a predetermined time period.

8. A gaming device comprising:
a processor circuit; and
a memory coupled to the processor circuit, the memory comprising machine-readable instructions that, when executed by the processor circuit, cause the processor circuit to:
determine an identity of a player of the gaming device;
transmit a first message to a blockchain node device in communication with the gaming device, the first message comprising a request for first play data corresponding to historical wagering activity by a player and wagering limit data associated with a limitation on wagering activity by the player;
receive a first blockchain block of a plurality of blockchain blocks of a blockchain data structure from the blockchain node device, wherein the first blockchain block comprises the first play data;
determine, based on the first blockchain block, whether the player is authorized to place a wager at the gaming device;
receive an input indicative of a wager by the player;
in response to a determination that the player is authorized to place a new wager, resolve the wager; and
transmit a second message to the blockchain node device, the second message comprising a second blockchain block comprising:
hash data associated with the first blockchain block; and
second play data corresponding to the new wager.

9. The gaming device of claim 8, wherein the machine-readable instructions further cause the processor circuit to, in response to a determination that the player is not authorized to place the new wager, notify the player that the player is not authorized to place the new wager.

10. The gaming device of claim 8, wherein each blockchain block of the plurality of blockchain blocks comprises:
hash data associated with a previous blockchain block of the plurality of blockchain blocks; and
play data corresponding to wagering activity.

11. The gaming device of claim 8, wherein the play data for each blockchain block of the plurality of blockchain blocks comprises:
identification data indicative of an identity of a player associated with the wagering activity.

12. The gaming device of claim 11, wherein the play data for each blockchain block of the plurality of blockchain blocks comprises:
wagering limit data indicative of a wagering limit associated with the player.

13. The gaming device of claim 8, wherein the play data for each blockchain block of the plurality of blockchain blocks comprises:
historical wagering activity data indicative of a result of the wagering activity.

14. The gaming device of claim 13, wherein the historical wagering activity is further indicative of a total amount wagered by the player during a predetermined time period.

15. The gaming device of claim 13, wherein the historical wagering activity is further indicative of a total amount lost by the player during a predetermined time period.

16. The gaming device of claim 13, wherein the historical wagering activity is further indicative of a total amount time played by the player during a predetermined time period.

17. A blockchain system for managing responsible gaming data, comprising:
a processor circuit; and
a memory coupled to the processor circuit, the memory comprising machine-readable instructions that, when executed by the processor circuit, cause the processor circuit to:
receive, at a blockchain node device, a plurality of messages from a gaming device in communication with the blockchain node device, each message comprising a blockchain block comprising:
hash data associated with a stored blockchain block of a blockchain data structure; and
play data corresponding to wagering activity by a player of the gaming device, the play data comprising:
identification data indicative of an identity of the player associated with the wagering activity; and
wagering limit data indicative of a wagering limit associated with the player;
for each message, store the blockchain block in the blockchain data structure;
access stored responsible gaming data associated with the player;

based on the play data comprising the wagering limit data of the plurality of blockchain blocks and the stored responsible gaming data, modify the stored responsible gaming data;

receive, from the gaming device, an authorization request message for further wagering activity by the player, the authorization request message comprising a first blockchain block of the blockchain data structure;

determine, based on the first blockchain block and the stored responsible gaming data, whether the further wagering activity by the player at the gaming device is authorized; and in response to a determination that the further wagering activity is authorized, transmit an authorization message to the gaming device comprising an instruction to permit the further wagering activity by the player.

18. The blockchain system of claim 17, wherein the instructions that cause the processor circuit to determine whether the further wagering activity is authorized further cause the processor circuit to:

determine whether the first blockchain block is valid; and in response to a determination that the first blockchain block is not valid, transmit an authorization denial message to the gaming device comprising an instruction to restrict the further wagering activity by the player.

19. The blockchain system of claim 17, wherein the play data for each blockchain block of the plurality of blockchain blocks comprises:

historical wagering activity data indicative of a result of the wagering activity.

20. The blockchain system of claim 19, wherein the historical wagering activity is further indicative of a total amount time played by the player during a predetermined time period.

* * * * *